(12) United States Patent
Mozafari

(10) Patent No.: US 7,180,203 B2
(45) Date of Patent: Feb. 20, 2007

(54) ELECTRIC GENERATOR

(76) Inventor: Mehdi Mozafari, 5859 Texhoma Ave., Encino, CA (US) 91316-1208

( * ) Notice: Subject to any disclaimer, the term of this patent is extended or adjusted under 35 U.S.C. 154(b) by 72 days.

(21) Appl. No.: 10/905,986

(22) Filed: Jan. 28, 2005

(65) Prior Publication Data
US 2006/0170220 A1 Aug. 3, 2006

(51) Int. Cl.
F03B 13/12 (2006.01)
(52) U.S. Cl. .......................... 290/53; 290/42
(58) Field of Classification Search ............ 290/42, 290/43, 53, 54
See application file for complete search history.

(56) References Cited
U.S. PATENT DOCUMENTS 3,911,287 A * 10/1975 Neville ................... 290/53
3,928,967 A * 12/1975 Salter ..................... 60/398
4,209,283 A * 6/1980 Marbury .................. 417/332
4,319,454 A * 3/1982 Lucia ..................... 60/506
4,560,884 A * 12/1985 Whittecar ................ 290/42
5,311,064 A * 5/1994 Kumbatovic .............. 290/53
5,808,368 A * 9/1998 Brown .................... 290/53

* cited by examiner

Primary Examiner—Nicholas Ponomarenko
(74) Attorney, Agent, or Firm—Rothwell, Figg, Ernst & Manbeck

(57) ABSTRACT

The present invention is a water-wave energy transducer comprising: a support foundation and a wave-plate having an edge. A first edge of the present invention is pivotally attached to the foundation. The plate is disposed to be oscillatingly displaced by the action of a water-wave and a restrictor plate is attached to the foundation disposed to retard the motion of said wave-plate. A push-rod has first and second ends and the first end of the rod is pivotally connected to the wave-plate. In addition, a transduction-wheel is pivotally connected to the second end of the rod. Further, a wheel is disposed to rotate under the action of the push-rod, and the wheel is disposed to operate an energy conservation means.

3 Claims, 1 Drawing Sheet

ELECTRIC GENERATOR

FIELD OF THE INVENTION

The present disclosure relates generally to the transduction of the energy contained in a water-wave, such as an ocean wave, into a form such as electrical energy or compressed air.

BACKGROUND

The information provided below is not admitted to be prior art to the present invention, but is provided solely to assist the understanding of the reader.

Wave energy can be considered as a concentrated form of solar energy. Winds, generated by the differential heating of the earth, pass over open bodies of water, transferring some of their energy to form waves. The amount of energy transferred, and hence the size of the resulting waves, depends on the wind speed, the length of time for which the wind blows and the distance over which it blows (the fetch). The World Energy Council has estimated the useful worldwide wave energy resource at >2 TW. (See Thorpe TW, "An Overview of Wave Energy Technologies: Status, Performance and Costs," in Wave Power: Moving towards Commercial Viability, 30 Nov. 1999, Broadway House, Westminster, London.

Many devices have been proposed to recover power from the energy contained in ocean waves. However, most of the proposed devices have suffered from being massive in size and having correspondingly high capital and generating costs. Therefore, a need exists for power generation devices that do not suffer from the flaws of prior art devices.

SUMMARY OF THE INVENTION

The present invention addresses unmet needs of the prior art by providing a simple device to recover the energy stored in ocean waves.

The present invention provides water-wave energy transducer comprising: a support foundation; a wave-plate having an edge, wherein first edge is pivotably attached to said foundation, and wherein said plate is disposed to be oscillatingly displaced by the action of a water-wave; a restrictor plate attached to said foundation disposed to retard a motion of said wave-plate; a push-rod having first and second ends, wherein said rod first end is pivotably connected to said wave-plate; and a transduction-wheel pivotably connected to said rod second end, wherein said wheel is disposed to rotate under the action of said push-rod, and wherein said wheel is disposed to operate an energy conservation means.

According to a preferred aspect, the transduction-wheel is attached to an electric generator. According to this aspect, the action of a water-wave on the wave plate ultimately is transduced into electrical energy. According to another aspect the transduction-wheel operates a compressor, such as an air compressor. According to yet another aspect, the transduction-wheel drives a pump, such as a water pump.

Still other aspects and advantages of the present invention will become readily apparent by those skilled in the art from the following detailed description, wherein it is shown and described preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

It is to be noted, however, that the appended drawings illustrate only typical embodiments of this invention and are therefore not to be considered limiting of its scope, for the invention may admit to other equally effective embodiments.

DETAILED DESCRIPTION

Detailed description of invention with reference to figures by numbers.

Reference is made to the figures to illustrate selected embodiments and preferred modes of carrying out the invention. It is to be understood that the invention is not hereby limited to those aspects depicted in the figures.

Figure 1A:
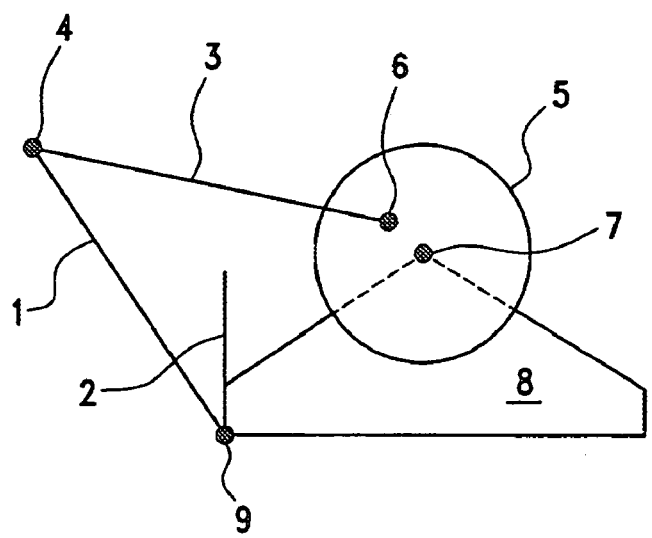
FIG. 1A depicts the inventive transducer substantially in a position adopted when acted upon by a trough of a wave.
Figure 1B:
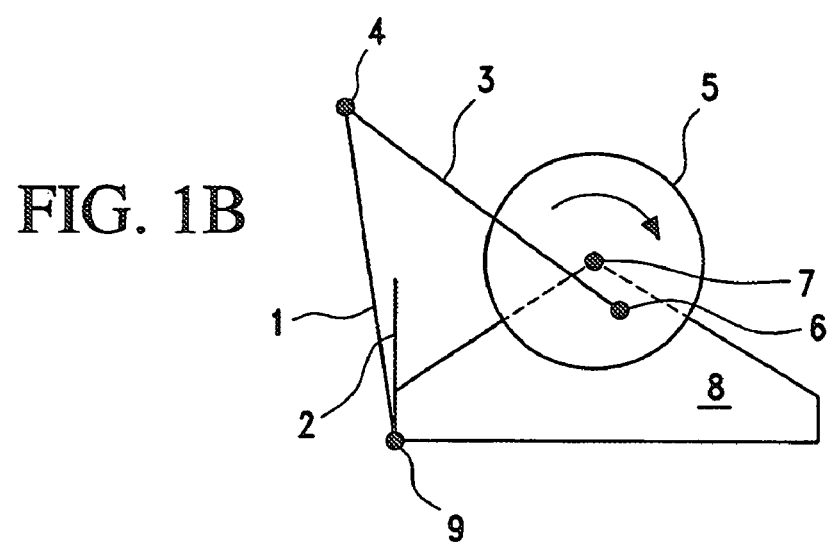
FIG. 1B depicts the transducer substantially as acted upon by a crest of a wave.
Figure 2:
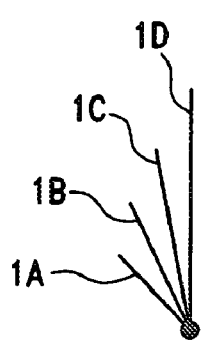
FIG. 2 is a detailed side view of an exemplary implementation for plurality of wave-plates.
Figure 3:
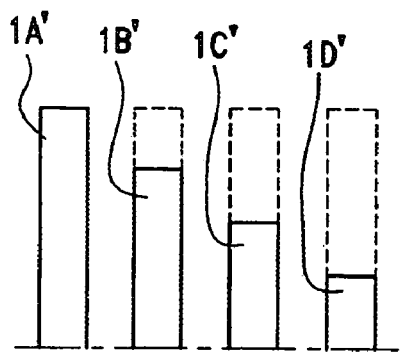
FIG. 3 is a frontal view of an exemplary implementation of a plurality of wave-plates.

FIG. 1A depicts the inventive water-wave energy transducer. A foundation 8 supports a wave-plate 1 and a transducer-wheel 5. Foundation 8 may be a single structure supporting both wave-plate 1 and a transduction-wheel 5, or the foundation may comprise two separate structures, each supporting one of either a wave-plate or a transduction-wheel. The wave-plates 1 is preferably a rectangular prism having at least one major surface (e.g., 1A, 1B, 1C, 1D, as shown in FIG. 2 or 1A', 1B', 1C', 1D', as shown in FIG. 3) disposed to be acted upon by an incoming wave and at least one edge. The edge is attached to the foundation by a hinge or pivot 9. The wave-plate 1 is displaced by the advancing swell of a water-wave. As the wave passes, the weight of the plate restores the plate to an equilibrium position. A restrictor plate 2 is attached to foundation 8. The restrictor plate 2 is disposed to retard the motion of the wave-plate 1. The restrictor plate 2 constrains the wave-plate to fall against the incoming wave. A push-rod 3 transmits force from the wave-plate into a transduction-wheel 5. The push-rod 3 has a first end pivotably connected to the wave-plate 1 by a pivot means 4. FIG. 1B depicts pivot means 4 as disposed at an end or edge of the wave-plate. However, pivot means 4 may be attached at any suitable location on wave-plate 1. A second end of push-rod 3 is connected to wheel 5 by pivot means 6. Pivot means 6 is located off axis on wheel 5, such that oscillations of wave-plate 1, transmitted by push-rod 3, cause wheel 5 to rotate.

The rotary power generated by the operation of the invention may be transmitted by shaft 7 to an energy conservation means. Suitable energy conservation means include, but are not limited to, devices such as electric generators, air compressors, and water pumps. According to a preferred aspect, the transduction-wheel is attached to an electric generator. According to this aspect, the action of a water-wave on the wave plate ultimately is transduced into electrical energy.

The push-rod 3 serves to operationally link the wave-plate 1 to the transduction-wheel 5. In an embodiment, a plurality of wave-plates may be operationally linked to a transduction wheel.

FIG. 2 is a detailed side view of an exemplary implementation for plurality of wave-plates. In particular, FIG. 2 shows a plurality of wave-plates 1A, 1B, 1C, 1D in different positions relative to one another. FIG. 3 is a frontal view of an exemplary implementation of a plurality of wave-plates. In particular, FIG. 3 shows a plurality of wave-plates 1A', 1B', 1C', 1D' with different heights relative to one another. The dotted segments of FIG. 3 indicate an alternative implementation where each plate is the same height.

By way of non-limiting example, an installation comprising four, four-foot by 12-foot wave-plates provides a 192 square-foot surface; equivalent to a 27,648 square inch surface. When acted upon by a wave having a minimum power of one pound per square inch, a force of 27,648 pounds is generated.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed as new and desired to be protected by Letters Patent of the United States is:

1. A water-wave energy transducer comprising:
   a support foundation;
   a wave-plate having an edge pivotably attached to said foundation, and
   wherein said plate is disposed to be oscillatingly displaced by the action of a water-wave;
   a restrictor plate attached to said foundation disposed to retard a motion of said wave-plate;
   a push-rod having first and second ends, wherein said rod first end is pivotably connected to said wave-plate; and
   a transduction-wheel pivotably connected to said rod second end, wherein said wheel is disposed to rotate under the action of said push-rod, and wherein said wheel is disposed to drive an energy conservation means.

2. The water-wave energy transducer, according to claim 1, wherein said energy conservation means is selected from the group consisting of electric generators, air compressors, and water pumps.

3. The water-wave energy transducer, according to claim 1, wherein a plurality of wave-plates is operationally linked to said transduction wheel.

* * * * *